US009566882B2

(12) United States Patent
Mihm et al.

(10) Patent No.: US 9,566,882 B2
(45) Date of Patent: Feb. 14, 2017

(54) AIRBAG MODULE

(71) Applicant: TK HOLDINGS INC., Auburn Hills, MI (US)

(72) Inventors: Russell Joseph Mihm, Beverly Hills, MI (US); Richard Andrew Wiik, Oakland, CA (US)

(73) Assignee: TK HOLDINGS INC., Auburn Hills, MI (US)

( * ) Notice: Subject to any disclaimer, the term of this patent is extended or adjusted under 35 U.S.C. 154(b) by 0 days.

(21) Appl. No.: 14/947,672

(22) Filed: Nov. 20, 2015

(65) Prior Publication Data

US 2016/0144818 A1 May 26, 2016

Related U.S. Application Data

(60) Provisional application No. 62/083,045, filed on Nov. 21, 2014.

(51) Int. Cl.
*B60R 21/231* (2011.01)
*B60N 2/42* (2006.01)
*B60R 21/2338* (2011.01)

(52) U.S. Cl.
CPC ........... *B60N 2/4235* (2013.01); *B60R 21/231* (2013.01); *B60R 21/2338* (2013.01); *B60R 21/23138* (2013.01); *B60R 2021/23107* (2013.01); *B60R 2021/23146* (2013.01); *B60R 2021/23161* (2013.01); *B60R 2021/23386* (2013.01)

(58) Field of Classification Search
CPC ............... B60R 21/207; B60R 21/2338; B60R 21/23138; B60R 2021/23386; B60R 2021/23146; B60R 2021/23161; B60R 2021/23107; B60N 2/4235
See application file for complete search history.

(56) References Cited

U.S. PATENT DOCUMENTS

| 5,251,931 A * | 10/1993 | Semchena ............. B60R 21/207 280/730.1 |
| 5,333,899 A * | 8/1994 | Witte ................. B60R 21/23138 280/728.1 |
| 5,636,862 A * | 6/1997 | Cheung ................. B60R 21/207 280/730.2 |
| 2005/0161918 A1 | 7/2005 | Bito |
| 2007/0267856 A1 | 11/2007 | Schedler |
| 2009/0315305 A1 * | 12/2009 | Evans ....................... B60N 2/58 280/730.2 |
| 2010/0078921 A1 * | 4/2010 | Ryan ..................... B60R 21/207 280/730.2 |
| 2011/0169250 A1 * | 7/2011 | Breuninger ........... B60R 21/207 280/730.2 |

(Continued)

OTHER PUBLICATIONS

International Search Report mailed Mar. 15, 2016 issued in PCT/US2015/061858.

(Continued)

*Primary Examiner* — Drew Brown
(74) *Attorney, Agent, or Firm* — Gordon & Rees LLP

(57) ABSTRACT

An airbag module mounted to an interior side of a bottom portion of a seat frame. The module includes an inflatable airbag and an inflator. The airbag is configured to deploy to a position directly inboard of an interior side of the seat bottom. A portion of the airbag extends above the seat bottom when the airbag is inflated.

20 Claims, 6 Drawing Sheets

(56) References Cited

U.S. PATENT DOCUMENTS

| | | | |
|---|---|---|---|
| 2012/0013107 A1* | 1/2012 | Shankar | B60R 21/23138 280/730.2 |
| 2012/0193897 A1 | 8/2012 | Ruedisueli et al. | |
| 2012/0223550 A1 | 9/2012 | Mazanek et al. | |
| 2013/0093224 A1* | 4/2013 | Dainese | B60R 21/207 297/216.12 |
| 2013/0113193 A1* | 5/2013 | Borjeson | B60R 21/23138 280/730.2 |
| 2013/0197764 A1 | 8/2013 | Thomas | |
| 2014/0151984 A1* | 6/2014 | Fukawatase | B60R 21/233 280/730.2 |
| 2015/0123382 A1* | 5/2015 | Rickenbach | B60R 21/207 280/728.2 |
| 2015/0197209 A1* | 7/2015 | Fujiwara | B60R 21/231 280/730.1 |
| 2016/0114755 A1* | 4/2016 | Matsuzaki | B60R 21/207 280/730.2 |

OTHER PUBLICATIONS

Written Opinion mailed Mar. 15, 2016 issued in PCT/US2015/061858.

* cited by examiner

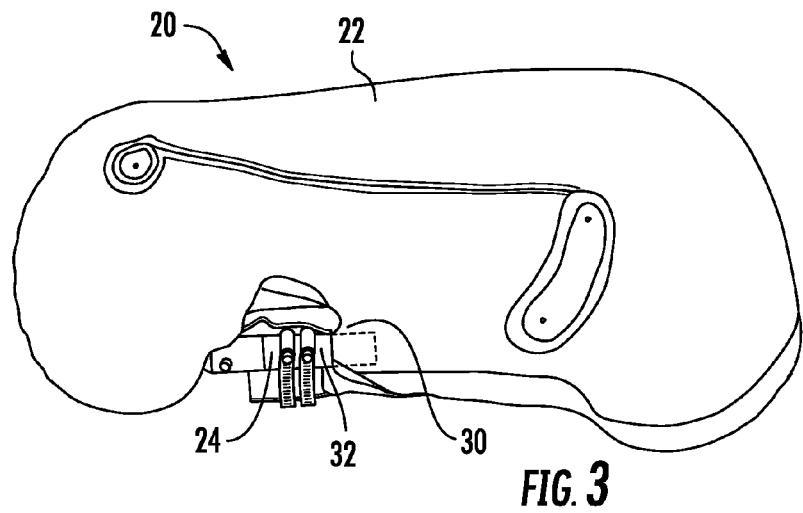
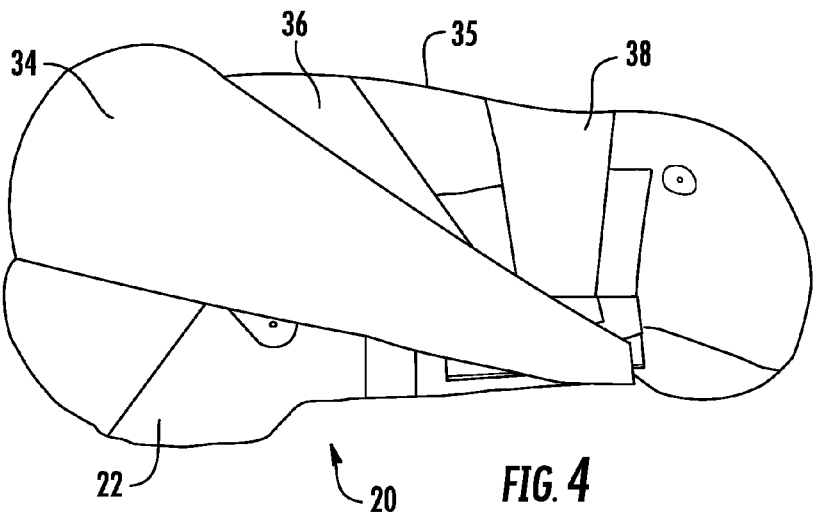
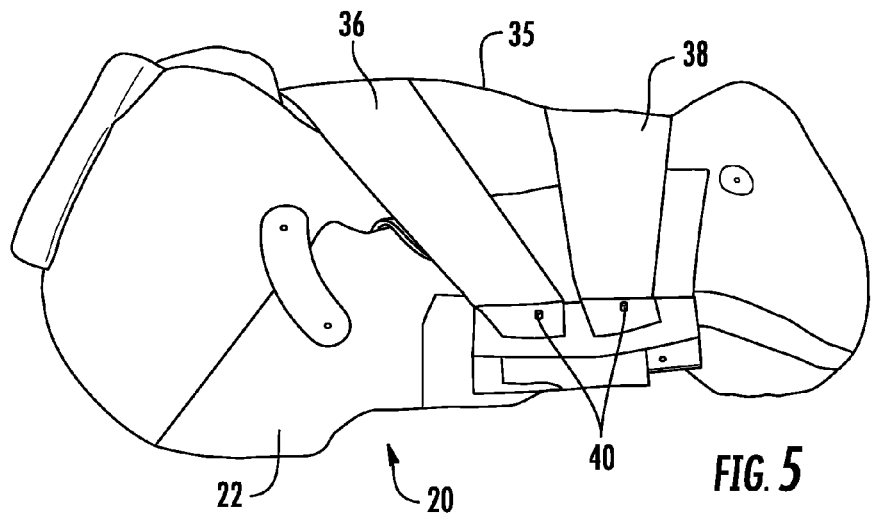

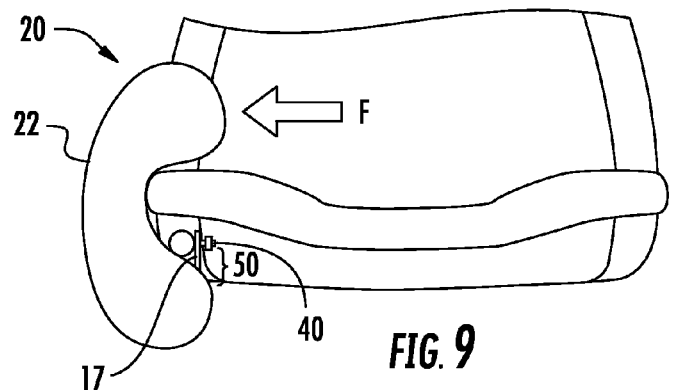
FIG. 9
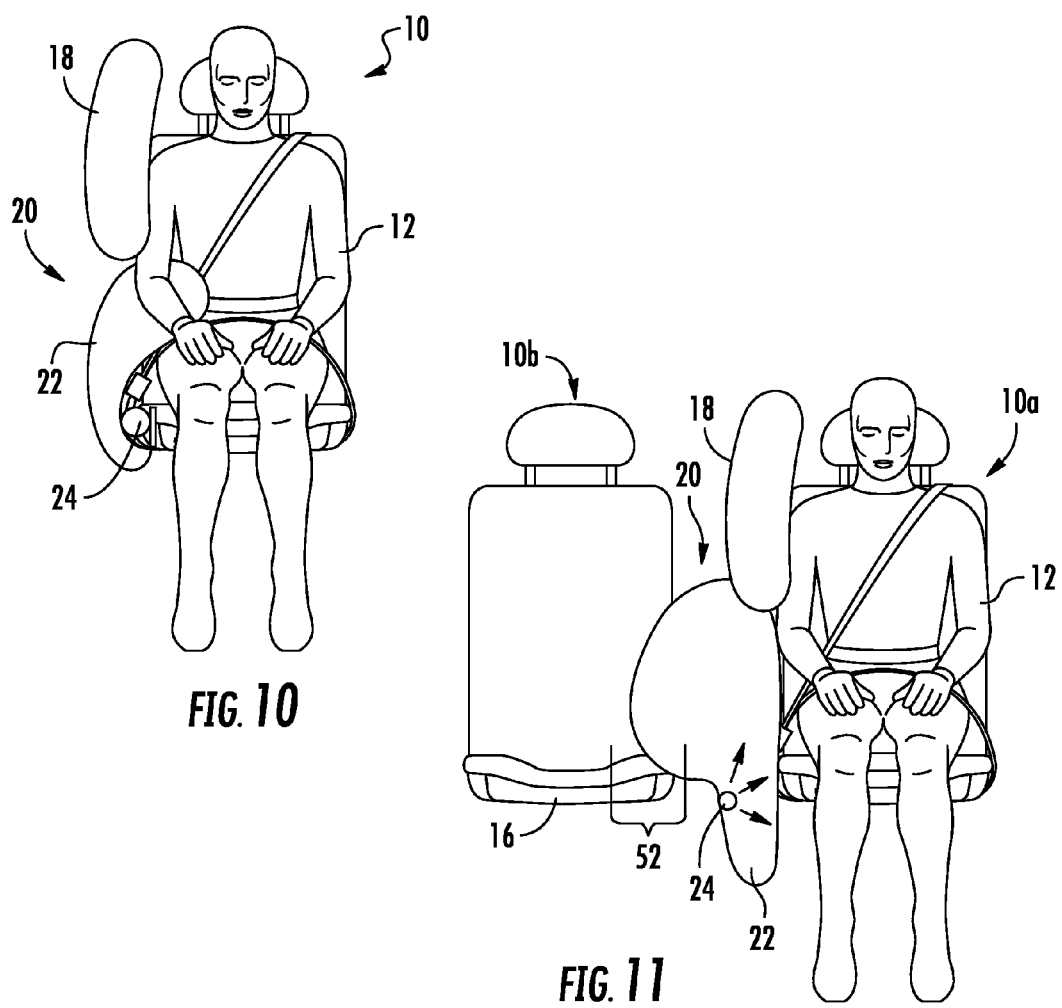
FIG. 10
FIG. 11

AIRBAG MODULE

CROSS REFERENCE TO RELATED APPLICATIONS

This application claims priority to and the benefit of U.S. Provisional Patent Application No. 62/083,045, filed on Nov. 21, 2014. The foregoing provisional application is incorporated by reference herein in its entirety.

GENERAL DESCRIPTION

The present application relates generally to the field of airbag modules.

Airbag systems or modules provide improved occupant protection during a dynamic vehicle event, such as a frontal or side impact. Airbag modules provide improved occupant protection or safety, during a dynamic vehicle event, by including an inflatable cushion or airbag that deploys and inflates from gas rapidly pushed into the cushion by means of an inflator, whereby the cushion deploys between the occupant being protected and another portion of the vehicle.

Current center side impact airbag (CSIAB) cushions utilize inflated fabric tubes or chambers and external tethering geometry to reduce occupant cross-car travel in a far-side impact. Some current designs also use interaction between an inflatable cushion and a center console whereby a lower portion of the inflated cushion is designed with a pre-determined width and depth to permit the cushion to abut or contact the center console of the vehicle and wedge between the vehicle console and occupant to reduce cross-car travel.

In many small vehicles with very narrow cross-car gap between the driver and passenger seats, there is little to no opportunity to use an interaction chamber to pinch or wedge against a console and provide supplemental restraint. If there is a console present in a small vehicle, it may be weak in structure due to its small size and may flex or bow when engaged by the occupant or cushion. In other vehicles, there is no console at all for the occupant or cushion to engage against, yielding the most extreme load case for an inflated cushion.

The interaction between the console and the inflatable cushion may reduce head and shoulder travel and may function as a means to keep the cushion from pivoting when engaged by the shoulder of the occupant. The console may facilitate the cushion forming a barrier between occupants or an occupant and an intruding object. In some embodiments, more interaction between the cushion and the console yields less occupant cross-car travel and may result in improved restraint performance in certain situations. The vehicle console also may provide restraint during an event. For example, hips and the legs of the occupant may engage the console as the occupant travels across the vehicle. This occupant interaction with the rigid vehicle console involves the majority of the occupant energy absorption, with the inflated cushion providing additional absorption.

Vehicles may require smaller airbag modules in order to fit into smaller vehicle environments. One way to reduce the size of the module is to reduce the size of the inflator and cushion. Thus, there may be a need for smaller volume cushions to meet packaging requirements and lower operating pressures through reduced inflator output. The cushion volume reduction, specifically for CSIAB applications, may result in the reduction or elimination of interaction between the cushion and the console. For example, reducing the size or volume of the lower portion of the cushion may result in the cushion no longer contacting or interacting with the center console when engaged by an occupant during a near or far-side crash event. In addition, certain smaller vehicles may not include a center console.

A reduction or elimination of the interaction between the cushion and the rigid vehicle console may lead to the cushion becoming the primary source of energy absorption. The various embodiments of airbag modules described herein allow for the cushion to absorb energy with or without the presence of a rigid center console.

SUMMARY

According to an embodiment disclosed herein, an airbag module mounted to an interior side of a bottom portion of a seat frame is provided. The module includes an inflatable airbag or cushion and an inflator for providing inflation gas for the airbag. The airbag is configured to deploy to a position directly inboard of an interior side of the seat bottom. A portion of the airbag extends above the seat bottom when the airbag is inflated. The airbag may be configured to extend in the fore and aft direction of the vehicle the entire longitudinal length of the seat bottom when inflated. In one embodiment, the airbag may be configured to extend forward of the front of the seat bottom. The airbag may be configured to deploy into a position extending both above and below the seat bottom. The length of the airbag in the fore and aft direction may be greater than the height of the airbag.

The airbag module may include at least one tether extending between a top edge of the airbag cushion and the seat frame. The tether may be configured to position the airbag above the seat bottom when the airbag is inflated. The tether is located on the exterior of the airbag. A second tether may be provided on the exterior of the airbag. The two tethers may be connected to the front and top edges of the airbag to stabilize the position of the airbag.

An occupant restraint system for a motor vehicle including adjacent driver and passenger seats is described herein. Each of the seats include a seat bottom and a seat back and is supported by a seat frame. The restraint system includes an inflatable airbag stored in a folded configuration in the seat bottom of one of the driver and passenger seats. An inflator is connected to the seat frame of the one of the driver and passenger seats and is configured to provide gas to inflate the airbag. The airbag is configured to inflate and deploy into a position on the inboard side of the one of the driver and passenger seats alongside the seat bottom.

The restraint may include an elongated positioning mechanism connected to the airbag at one end and anchored to the seat frame at the other end. The elongated positioning mechanism may include at least two tethers, and wherein one of the tethers is connected to a front edge of the airbag and another one of the tethers is connected to a top edge of the airbag.

The system may include a second inflatable airbag stored in the seat back of the one of the driver and passenger seats. The second inflatable airbag is configured to inflate and deploy into a position on the inboard side of the one of the driver and passenger seats alongside the seat back to thereby absorb energy resulting from movement of the upper body of the occupant. The airbag that is stored in the seat bottom of the passenger seat may be configured to inflate and deploy into a position where a portion of the inflated airbag is located on top of the seat bottom of the passenger seat so that the seating surface of the seat bottom of the passenger seat resists the moment created by the force of the driver impacting the upper portion of the inflated airbag.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 is a front view of the airbag module of FIG. 2 in a flattened, uninflated configuration.

FIGS. 4 and 5 are back views of the airbag module of FIG. 2 in a flattened, uninflated configuration.

FIG. 9 is a schematic side view of the airbag module of FIG. 2 in an inflated configuration, showing the interaction between the airbag and the seat bottom frame.

FIG. 10 is a schematic front view of the airbag module of FIG. 2 in an inflated configuration, in use with a center side impact airbag mounted to the same vehicle seat.

FIG. 11 is a schematic front view of the airbag module of FIG. 2 in an inflated configuration, in use with a center side impact airbag mounted to a second vehicle seat.

DETAILED DESCRIPTION

Various features of the airbag module will be described with reference to the drawings. Like numbers are used throughout the drawings to refer to the same or similar parts and in each of the embodiments of the invention hereafter described.

Figure 1:
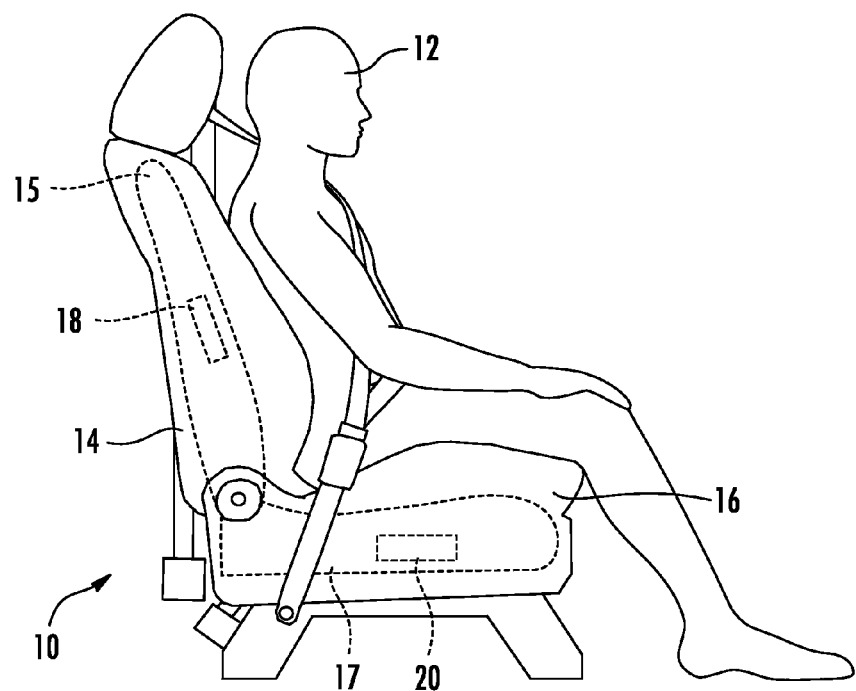
FIG. 1 is a side view of a vehicle seat including a seat bottom airbag module, according to an exemplary embodiment.

As shown in FIG. 1, a vehicle seat 10 for a vehicle is provided to support an occupant 12. The vehicle seat 10 includes an airbag module 20 located in the bottom of the seat 16. The module 20 is configured to include an airbag that deploys into a position to absorb energy and limit the cross-car (e.g., lateral, side-to-side) movement of the occupant 12 in a side impact event (e.g., a far side crash). The vehicle seat 10 includes a seat back 14 with a seat back frame 15 and a seat bottom 16 with a seat bottom frame 17. The seat bottom airbag module 20 is mounted to the inboard portion of the seat bottom frame 17. While the seat bottom airbag module 20 is generally shown as being configured for a driver side passenger, the seat bottom airbag module 20 is applicable to both driver side and passenger side configurations. The seat bottom airbag module 20 may be used to provide protection to any occupant located in any seating row (e.g., first, second, third) of a vehicle.

Figure 2:
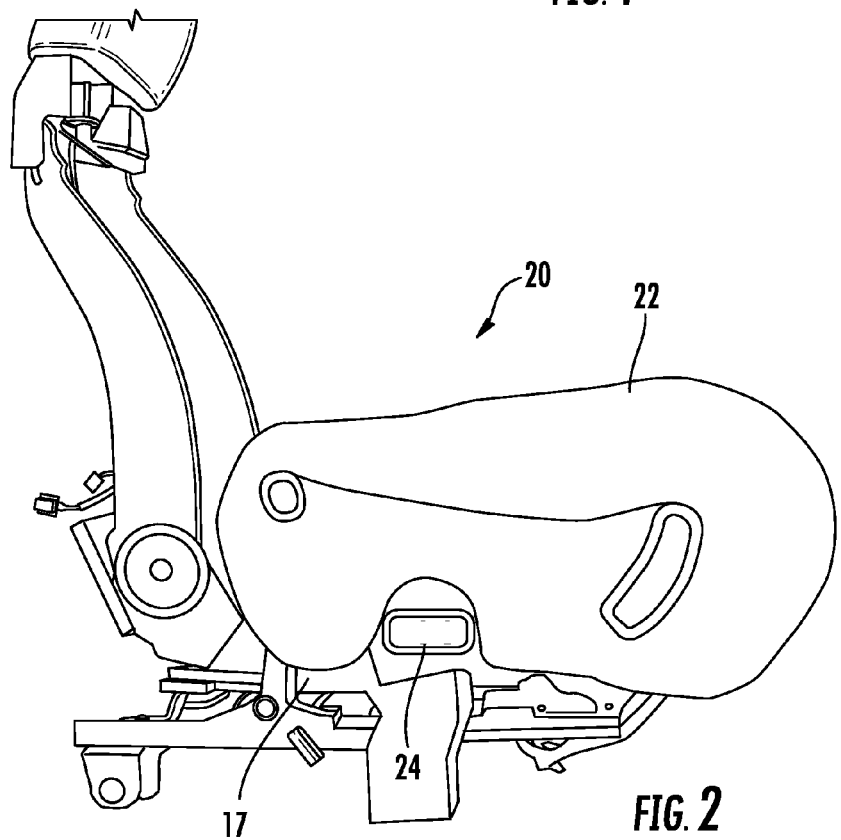
FIG. 2 is an outboard side view of a vehicle seat including a seat bottom airbag module in an inflated configuration, according to an exemplary embodiment.

The airbag module 20 is configured to reduce the displacement and acceleration of the occupant 12 reducing the forces and absorbing energy upon impact by the occupant 12. As shown in FIG. 2, the airbag module 20 includes an airbag or cushion 22 and an inflator 24. The inflator 24 may be a pyrotechnic device or other airbag inflation device that is configured to generate gas at a high volumetric flow rate for the inflatable airbag 22. The inflation gas provided by the inflator 24 fills the airbag 22, expanding the airbag 22 to deploy from the side bolster of the seat bottom 16 to a position between the occupant 12 and the center of the vehicle and another seat in the same row, as well as the passenger seated therein. The airbag module 20 may work with other systems, such as a center side impact airbag module 18 mounted to the seat back frame 15, to reduce the lateral acceleration and displacement of the driver during a dynamic event. The airbag module 20 utilizes the interaction between the airbag 22 and the seat bottom frame 17 to simulate the occupant's interaction with a console to provide supplemental restraint in vehicle environments where no console is present or the present console is weak/unsubstantial and may flex or bow when engaged by the occupant or airbag of the center side impact airbag 18 in a side impact event.

In FIGS. 3-5, the airbag module 20 is shown in an uninflated configuration, detached from the seat bottom frame 17. The airbag 22 is generally formed from a first panel (e.g., inboard panel, inner panel, front panel, etc.) and a second panel (e.g., outboard panel, outer panel, rear panel, etc.) that are coupled together by a plurality of sewn seams. According to an exemplary embodiment, the first panel and the second panel are a nylon fabric. The panels may be sewn together or secured by other suitable methods such as thermobonding or welding. The panels and the connecting seams may be coated with a sealant in order to reduce the leakage of inflation gas. The airbag 22 may be divided into two or more compartments (e.g., chambers, tubes, etc.). Passages or ports may be provided between individual compartments such that the compartments are in fluid communication with each other. The airbag 22 may also include a plurality of un-inflated portions such as un-inflated portions that generally separate the compartments.

The inflator 24 may include a conduit portion for carrying the inflation gas from a gas generating portion of the inflator 24 to the airbag 22. The conduit portion of the inflator 24 is received in a narrow neck 30 of the airbag through an opening 32, which opens into the interior compartments of the airbag 22.

The cushion or airbag 22 may be provided to function with an elongated positioning mechanism such as, for example, straps or tethers. The tethers may be internal or external. As shown in FIGS. 4 and 5, external tethers 34, 36, and 38 may be provided to control the deployment of the airbag 22. The external tethers 34, 36, and 38 may, for example, be formed by fabric panels that extend from a sewn seam (e.g., an outer peripheral seam 35) to mounting devices, shown as mounting studs 40. The tethers 34, 36, and 38 are configured to pre-position the airbag 22 to an upright position during inflation. After inflation, the tethers 34, 36, and 38 function to add strength and rigidity to the airbag 22.

The mounting studs 40 may pass through or may be coupled to a mounting plate adjacent the seat frame 17. The airbag module 20 may be coupled to the seat bottom frame 17 by passing the mounting studs 40 through openings in the seat bottom frame 17. Fasteners, shown as nuts 44 are coupled to the mounting studs 40 to secure the airbag module 20 to the seat bottom frame 17. According to other exemplary embodiments, the airbag module 20 may be coupled to the seat bottom frame 17 by another suitable coupling mechanism, such as a snap fastener or a fastening feature integrally formed in the seat bottom frame 17 and/or the airbag module 20 (e.g., integrally formed in the mounting bracket). The airbag 22 (e.g., the lower portion of the airbag 22) may include reinforcement to prevent damage to the airbag 22 by sharp corners or other features of the seat bottom frame 17.

Figure 6:
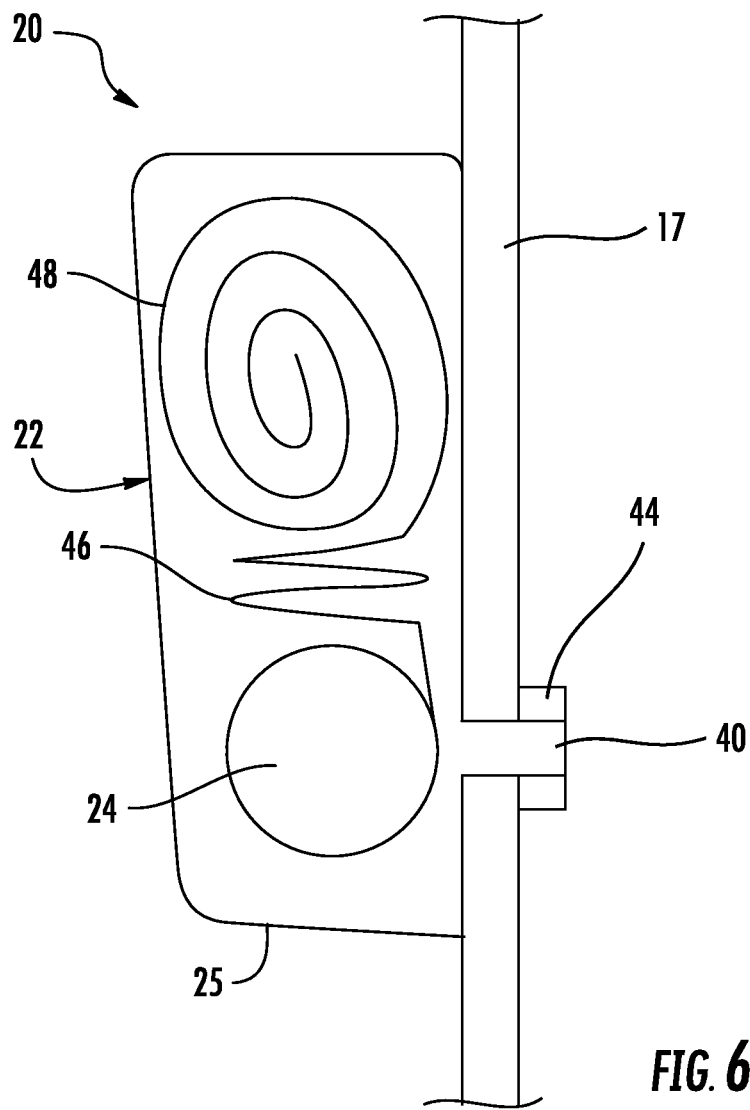
FIG. 6 is a schematic front view of the airbag module of FIG. 2 in a stored, uninflated configuration.

As shown in FIG. 6, the airbag module 20 is secured to the seat bottom frame 17 and stored with the airbag 22 in a folded, uninflated configuration. The uninflated airbag 22 may include both folded (e.g., pleated) sections 46 and rolled sections 48 to compact the airbag 22 in order for it to fit into the small cross-section of the storage area and to achieve a desired trajectory when the airbag module 20 is activated. According to some exemplary embodiments, the airbag module 20 may include a housing 25 in which the airbag 22 and the inflator 24 are contained. The housing 25 includes a seam, joint, opening, or other structure that allows the airbag 22 to emerge from the housing 25 when it is inflated by the inflator 24.

Figure 7:
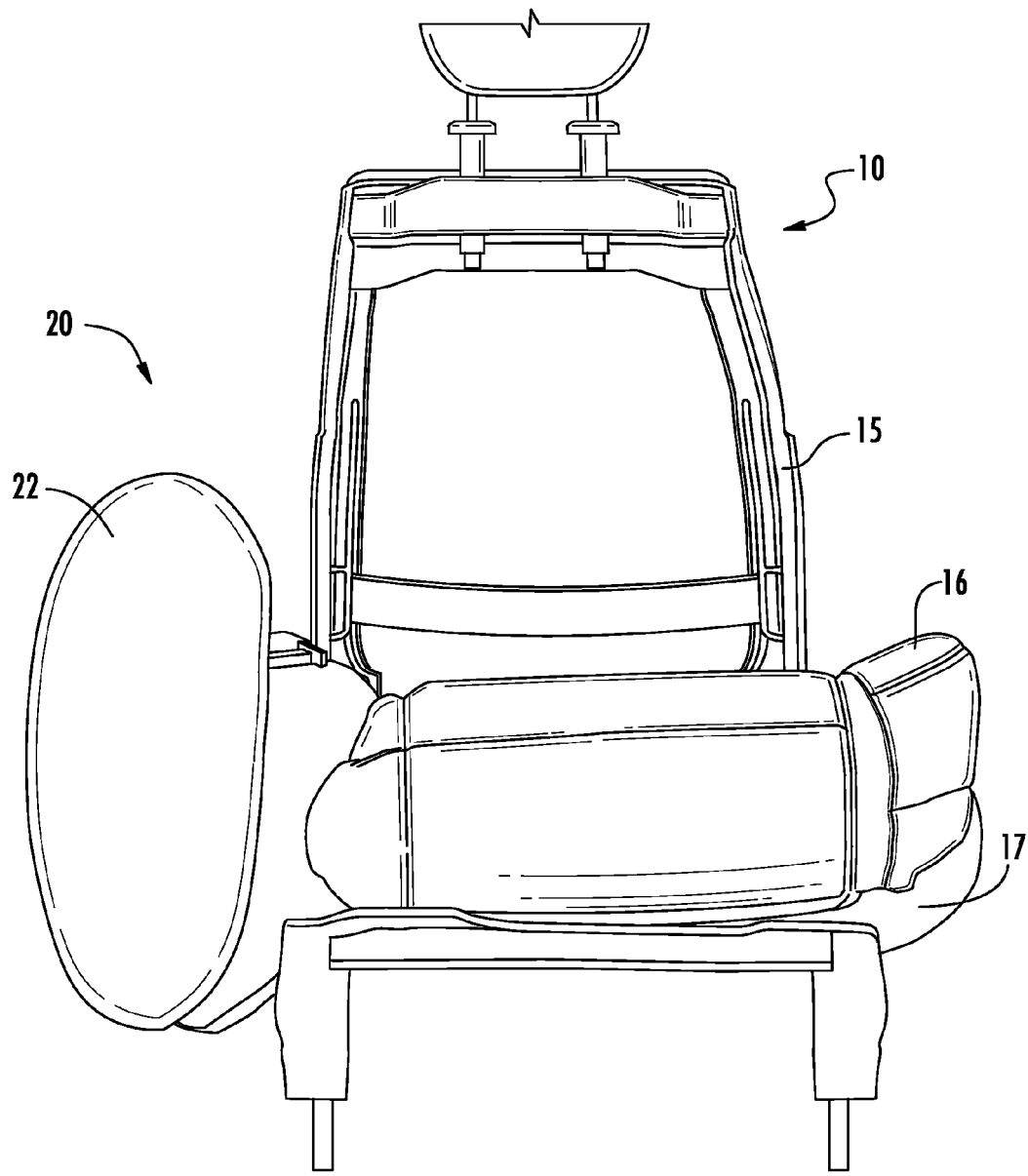
FIG. 7 is a front view of the vehicle seat including a seat bottom airbag module of FIG. 2.
Figure 8:
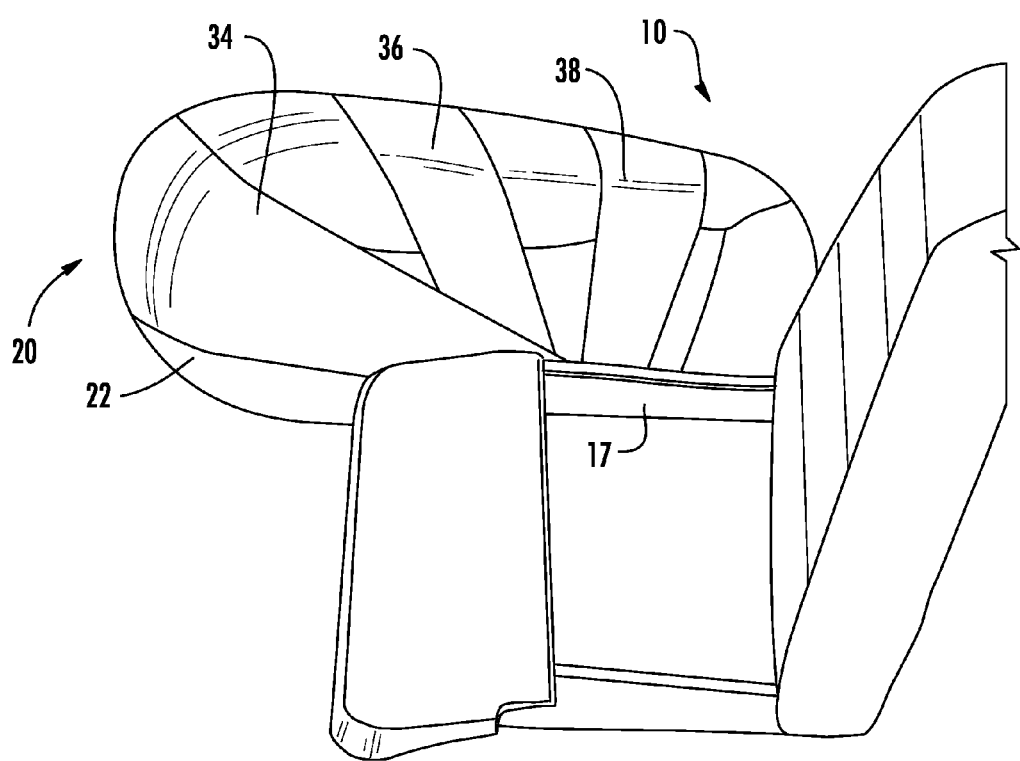
FIG. 8 is an inboard side view of the vehicle seat including a seat bottom airbag module of FIG. 2 with the seat bottom cushion removed.

Referring to FIGS. 7-8, various views of airbag module 20 in an inflated configuration are shown. According to an exemplary embodiment, the inflated airbag 22 is a stiff, rigid, upright cushion that is disposed along the seat bottom 16. The upper portion of the airbag 22 is positioned proximate to the hips and legs of the occupant 12, covering the thigh, knees, and hip joint of occupant 12. The airbag 22 is configured to simulate the engagement between the hips and legs of the occupant 12 and a center console.

Referring to FIGS. 9 and 10, the airbag module 20 is mounted to the seat bottom frame 17 such that there is an interaction between the inflated airbag 22 and the seat bottom frame 17 when the airbag module 20 is activated and engaged by the occupant 12. In a collision (e.g., a side-impact event, rollover event, etc.) the occupant 12 applies a lateral force (F) on the upper portion of the inflated airbag 22. The moment created by the occupant force (F) is resisted at a contact area 50 between the airbag 22 and the seat bottom frame 17 below the mounting studs 40 to retain the airbag 22 in a generally vertical orientation. As shown in FIG. 10, the airbag deploying from the seat back mounted module 18 may contact the airbag 22 deploying from the seat bottom, and vice versa. The airbags function as complementary protection devices providing support to one another and serving as a reaction surface for the other airbag to contact during deployment.

Referring to FIG. 11, in another embodiment, the airbag module 20 may be mounted to the passenger side seat 10b instead of to the driver side seat 10a. The airbag 22 is configured to wrap around the upper portion of the seat bottom 16 of the passenger side seat 10b. In a collision (e.g., a side-impact event, rollover event, etc.) the occupant 12 of the driver side seat 10a applies a lateral force on the upper portion of the inflated airbag 22. The moment created by the occupant force is resisted at a contact area 52 between the airbag 22 and the top of the seat bottom 16. Initially, during a crash event the seat bottom mounted bag 22 would deploy vertically and horizontally to abut against the occupant's hip, thigh and knee and thereby providing initial restraint to the lower portion of the occupant's body. Such restraint could prevent the occupant from swiveling in the seat towards the far side of the vehicle and potentially toward either another occupant and/or an intruding portion of the vehicle. If no center console is present, the airbag could become effectively wedged between the seats and/or between two occupants providing further force resistance and energy absorption.

The seat bottom airbag module 20 improves the cross-car restraint of an occupant by simulating the interaction between the occupant and the vehicle console in a vehicle lacking a console between the vehicle seats. The seat bottom airbag module 20 may also be utilized to augment the cross-car restraint of a console that may flex or otherwise be incapable of resisting the lateral force of the occupant.

The seat bottom airbag module 20 allows other occupant restraint systems to be simplified. For example, the complexity, size, and cost of a typical center side impact airbag (CSIAB) module may be reduced as the seat bottom airbag module 20 is configured to account for a portion of the occupant energy in a collision. The seat bottom airbag module 20 may also be utilized in current systems to further improve cross-car restraint.

The seat bottom airbag module 20 may be utilized in either the driver side seat 10a or the passenger side seat 10b with multitude of airbag or cushion variants. The seat bottom airbag module 20 may be mounted to the seat bottom frame 17 with or without a mounting bracket 42. The seat bottom airbag module 20 may include external tethering (e.g., tethers 34, 36, and 38) or may lack external tethers.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag assembly comprising:
   an airbag module mounted to an interior side of a seat bottom of a seat bottom frame, wherein the airbag module includes
   an inflator; and
   an inflatable airbag, the airbag configured to inflate and deploy to a position directly inboard of the interior side of the seat bottom such that the airbag interacts with the seat bottom frame to laterally restrain a vehicle occupant,
   wherein a portion of the airbag extends above the seat bottom when the airbag is inflated and resists a moment created by a force of the vehicle occupant impacting the portion of the airbag.

2. The airbag module of claim 1, further comprising at least one tether extending between a top edge of the airbag and the seat bottom frame, wherein the tether is configured to position the airbag above the seat bottom.

3. The airbag module of claim 2, wherein the tether is located on the exterior of the airbag.

4. The airbag module of claim 3, further comprising a second tether located on the exterior of the airbag and extending between a front edge of the airbag and the seat bottom frame.

5. The airbag module of claim 4, wherein the second tether is connected to both the top edge and the front edge of the airbag.

6. The airbag module of claim 1, wherein the airbag is configured to extend the entire longitudinal length of the seat bottom when inflated.

7. The airbag module of claim 6, wherein the airbag is configured to extend forward of the front of the seat bottom.

8. The airbag module of claim 6, wherein the length of the airbag in the fore and aft direction is greater than the height of the airbag.

9. An occupant restraint system for a motor vehicle including an adjacent driver seat and passenger seat, wherein each seat includes a seat bottom and a seat back supported by a seat frame, the restraint system comprising:
   an airbag module mounted to an interior side of a seat bottom of a seat bottom frame of one of the driver seat and the passenger seat, wherein the airbag module includes
   an inflatable airbag stored in a folded configuration in the seat bottom of the one of the driver seat and passenger seat and configured to inflate and deploy to a position directly inboard of the interior side of the seat bottom of the one of the driver seat and the passenger seat such that the airbag interacts with the seat bottom frame to laterally restrain a vehicle occupant; and
   an inflator connected to the seat bottom frame of the one of the driver seat and passenger seat and configured to provide gas to inflate the airbag;
   wherein the airbag is configured to inflate and deploy to the position directly inboard of the interior side of the seat bottom of the one of the driver seat and passenger seat alongside the seat bottom and resist a moment created by a force of the vehicle occupant impacting the airbag.

10. The system of claim 9, further comprising an elongated positioning mechanism connected to the airbag at one end and anchored to the seat frame at the other end.

11. The system of claim 10, wherein the elongated positioning mechanism includes at least two tethers, and wherein one of the tethers is connected to a front edge of the airbag and another one of the tethers is connected to a top edge of the airbag.

12. The system of claim 9, further comprising a second inflatable airbag stored in a seat back of the one of the driver seat and passenger seat, wherein the second inflatable airbag is configured to inflate and deploy into a position on the inboard side of the one of the driver seat and passenger seat alongside the seat back to thereby absorb energy resulting from movement of the upper body of the vehicle occupant.

13. The system of claim 9, wherein the airbag is stored in the seat bottom of the passenger seat and is configured to inflate and deploy into a position where a portion of the inflated airbag is located on top of the seat bottom of the passenger seat so that the seating surface of the seat bottom of the passenger seat resists the moment created by the force of the driver impacting an upper portion of the inflated airbag.

14. The system of claim 12, wherein, in the deployed position, the second inflatable airbag is in contact with the first inflatable airbag so that each airbag provides support for the other airbag.

15. A system for protecting an occupant of a vehicle seat including a seat frame that supports a seat bottom and a seat back, the seat being one of an adjacent driver seat and passenger seat, the system comprising:
   an airbag module mounted to an interior side of a seat bottom of a seat bottom frame, wherein the airbag module includes
   an inflator; and
   an inflatable airbag secured to the seat bottom frame and stored in the seat bottom prior to inflation,
   wherein the airbag is configured to inflate and deploy to a position between the driver seat and passenger seat and is configured to extend longitudinally along the entire length of the seat bottom such that the airbag interacts with the seat bottom frame to laterally restrain the occupant by resisting a moment created by a force of the occupant impacting the airbag.

16. The system of claim 15, further comprising a tether extending between the seat bottom frame and an edge of the airbag, wherein the tether is configured to stabilize the position of the airbag after deployment.

17. The system of claim 16, further comprising a second tether extending between the seat bottom frame and an edge of the airbag, wherein the second tether extends substantially in the vertical direction upward from the seat frame.

18. The system of claim 15, wherein the airbag is configured so that when the airbag is inflated the airbag covers substantially the entire side surface of the seat bottom.

19. The system of claim 15, wherein the airbag is configured to deploy into a position extending both above and below the seat bottom.

20. The system of claim 15, wherein the airbag is configured to deploy into a position overlying the seat bottom of the seat to which the airbag is not attached.

* * * * *